(12) United States Patent
Kim et al.

(10) Patent No.: US 10,892,502 B2
(45) Date of Patent: Jan. 12, 2021

(54) APPARATUS AND METHOD FOR CONTROLLING OPERATION OF FUEL CELL SYSTEM

(71) Applicants: Hyundai Motor Company, Seoul (KR); Kia Motors Corporation, Seoul (KR)

(72) Inventors: Jae Hoon Kim, Gyeonggi-do (KR); Ui Sik Jeon, Seoul (KR); Jong Hyun Lee, Gyeonggi-do (KR); Kwi Seong Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 16/179,960

(22) Filed: Nov. 4, 2018

(65) Prior Publication Data
US 2019/0312291 A1 Oct. 10, 2019

(30) Foreign Application Priority Data
Apr. 5, 2018 (KR) .................. 10-2018-0039511

(51) Int. Cl.
| | | |
|---|---|---|
| *H01M 8/04* | (2016.01) | |
| *H01M 8/04746* | (2016.01) | |
| *H01M 8/04082* | (2016.01) | |
| *H01M 8/04111* | (2016.01) | |
| *H01M 8/04537* | (2016.01) | |

(52) U.S. Cl.
CPC .... *H01M 8/04753* (2013.01); *H01M 8/04111* (2013.01); *H01M 8/04201* (2013.01); *H01M 8/04589* (2013.01); *H01M 8/04649* (2013.01)

(58) Field of Classification Search
CPC ......... H01M 8/04111; H01M 8/04589; H01M 8/04649; H01M 8/04753
USPC ......................................... 429/431
See application file for complete search history.

(56) References Cited

U.S. PATENT DOCUMENTS

| | | | | |
|---|---|---|---|---|
| 2015/0343903 A1* | 12/2015 | Lee | ............... | H01M 16/006 701/22 |
| 2016/0087293 A1* | 3/2016 | Yu | ............... | H01M 8/04223 429/429 |

FOREIGN PATENT DOCUMENTS

| | | |
|---|---|---|
| JP | 2007-257956 A | 10/2007 |
| JP | 2011-204430 A | 10/2011 |
| JP | 5812118 B2 | 11/2015 |
| KR | 10-1673345 B1 | 11/2016 |
| KR | 10-2017-0119831 A | 10/2017 |
| KR | 10-1807918 B1 | 12/2017 |

* cited by examiner

*Primary Examiner* — James M Erwin
(74) *Attorney, Agent, or Firm* — Mintz Levin Cohn Ferris Glovsky and Popeo, P.C.; Peter F. Corless

(57) ABSTRACT

An apparatus and method for controlling operation of a fuel cell system is provided. The method includes measuring a stack current and a stack insulation resistance. The measured stack current is compared with a predetermined current reference value and the measured stack insulation resistance is compared with a predetermined first insulation reference value. An air supply amount to a fuel cell stack is increased during a predetermined time when the measured stack current is less than the predetermined current reference value and the measured stack insulation resistance is less than or equal to the predetermined first insulation reference value.

20 Claims, 4 Drawing Sheets

APPARATUS AND METHOD FOR CONTROLLING OPERATION OF FUEL CELL SYSTEM

CROSS-REFERENCE TO RELATED APPLICATION

This application claims under 35 U.S.C. § 119(a) the benefit of priority to Korean Patent Application No. 10-2018-0039511 filed on Apr. 5, 2018, the entire contents of which are incorporated herein by reference.

BACKGROUND

(a) Technical Field

The present disclosure relates to an apparatus and a method for controlling operation of a fuel cell system, and more particularly, to a control apparatus and a method for improving the insulation performance of a fuel cell system.

(b) Background Art

A fuel cell is a type of power generation apparatus that converts chemical energy of fuel into electrical energy by reacting electrochemically in a stack without converting it into heat by combustion. Such a fuel cell supplies electric power for industrial, household, and vehicle driving, and also may be applied to the power supply of a small electric/electronic product, especially a portable device.

A polymer electrolyte membrane fuel cell (PEMFC), also known as a proton exchange membrane fuel cell among fuel cells, has been used as a power source for driving a vehicle. Particularly, the polymer electrolyte membrane fuel cell has lower operating temperature, higher efficiency, higher current density and output density, shorter starting time, and faster response to load changes than other types of fuel cells, and thereby may be widely used as a portable power source or for a vehicle power source.

The polymer electrolyte membrane fuel cell includes a membrane electrode assembly (MEA) having a catalyst electrode layer where electrochemical reaction occurs on both sides of the membrane with respect to a polymer electrolyte membrane in which hydrogen ions migrate, a gas diffusion layer (GDL) that distributes the reaction gases evenly and delivers the generated electric energy, a gasket and a fastening mechanism for maintaining the airtightness and the proper fastening pressure of the reaction gases and the cooling water, and a bipolar plate for moving the reaction gases and the cooling water.

In addition, a fuel cell system applied to a fuel cell vehicle includes a fuel cell stack that generates electric energy from an electrochemical reaction of a reaction gas (e.g., hydrogen which is a fuel and oxygen which is an oxidizer), a hydrogen supply device that supplies hydrogen that is a fuel to the fuel cell stack, an air supply device that supplies air containing oxygen to the fuel cell stack, a heat and water management system that adjusts temperature of the fuel cell stack and performs a water management function, and a fuel cell controller configured to execute the overall operation of the fuel cell system.

In a general fuel cell system, the hydrogen supply device includes a hydrogen storage (e.g., hydrogen tank), a regulator, a hydrogen pressure control valve, a hydrogen recirculation device, etc., and the air supply device includes an air blower, a humidifier, etc., and the heat and water management system includes a coolant pump, a water tank, a radiator, etc.

Meanwhile, in the stack of the fuel cell system, water is generated as a result of the reaction between hydrogen and oxygen, and when the generated water accumulates in the stack, performance of the fuel cell system may be deteriorated due to the generated water remaining in the stack. The generated water remaining in the stack is discharged to the outside while flowing along the air supplied into the stack. However, when the fuel cell vehicle is operated for a substantial period of time in a low air flow region (e.g., a voltage restricting region), the air supply amount is reduced to significantly reduce the water flow and thereby, the generated water in the stack is not smoothly discharged. Accordingly, a conductive path is formed by the cumulative generated water as the generated water in the stack is accumulated to lower the insulation resistance of the fuel cell stack. Therefore, when the fuel cell vehicle is operated for a substantial period of time in the low air flow region, a technique for preventing a decrease in the insulation resistance of the stack is required.

The above information disclosed in this section is merely for enhancement of understanding of the background of the disclosure and accordingly it can contain information that does not form the prior art that is already known in this country to a person of ordinary skill in the art.

SUMMARY

The present disclosure provides an apparatus and a method for controlling operation of a fuel cell system, which may effectively manage the amount of water in the stack through the operation control of the fuel cell system, thus preventing the insulation resistance of a fuel cell stack from being reduced.

In an exemplary embodiment of the present disclosure, a method of controlling operation of a fuel cell system may include measuring, by a sensor unit, a stack current and a stack insulation resistance; comparing, by a controller, the measured stack current with a predetermined current reference value, and comparing the measured stack insulation resistance with a predetermined first insulation reference value; and increasing, by the controller, an air supply amount to a fuel cell stack during a predetermined period of time when the measured stack current is less than the predetermined current reference value and the measured stack insulation resistance is less than or equal to the predetermined first insulation reference value.

In addition, in another exemplary embodiment of the present disclosure, a method of controlling operation of a fuel cell system may include measuring, by a sensor unit, an initial insulation resistance; comparing, by a controller, the initial insulation resistance with the predetermined first insulation reference value; measuring, by the sensor unit, a stack current and a stack insulation resistance when the initial insulation resistance is greater than the first insulation reference value; comparing, by the controller, the measured stack current with a predetermined first current reference value, and comparing the measured stack insulation resistance with a predetermined second insulation reference value; and increasing, by the controller, an air supply amount to a fuel cell stack during a predetermined time when the measured stack current is less than the predetermined first current reference value, and the measured stack insulation resistance is less than or equal to the predetermined second insulation reference value.

According to yet another exemplary embodiment of the present disclosure, an apparatus for controlling operation of a fuel cell system may include a fuel cell stack; an air compressor configured to supply air to the fuel cell stack; an air blocking valve interposed between the air compressor and the fuel cell stack, and installed at a cathode inlet side of the fuel cell stack; a sensor unit configured to measure a stack current and a stack insulation resistance of the fuel cell stack; and a controller configured to receive the information measured from the sensor unit and execute the operations of the air compressor and the air blocking valve; and the controller may be configured to compare the stack current measured by the sensor unit with a predetermined first current reference value, and compare the stack insulation resistance measured by the sensor unit with a predetermined insulation reference value, and the controller may be configured to increase the RPM of the air compressor to increase the air supply amount supplied to the fuel cell stack when the measured stack current is less than the predetermined first current reference value, and the measured stack insulation resistance is less than or equal to the predetermined first insulation reference value.

According to the exemplary embodiment of the present disclosure, it may be possible to effectively prevent the insulation resistance from being reduced by adjusting the revolutions per minute (RPM) of the compressor for supplying air, thus improving the operation stability of the fuel cell system. In addition, according to the exemplary embodiment of the present disclosure, there is the effect that by solving the problem of battery overcharging that may occur upon recovery of the insulation performance, the battery endurance and fuel efficiency of the fuel cell vehicle may be improved.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

DETAILED DESCRIPTION

Figure 1:
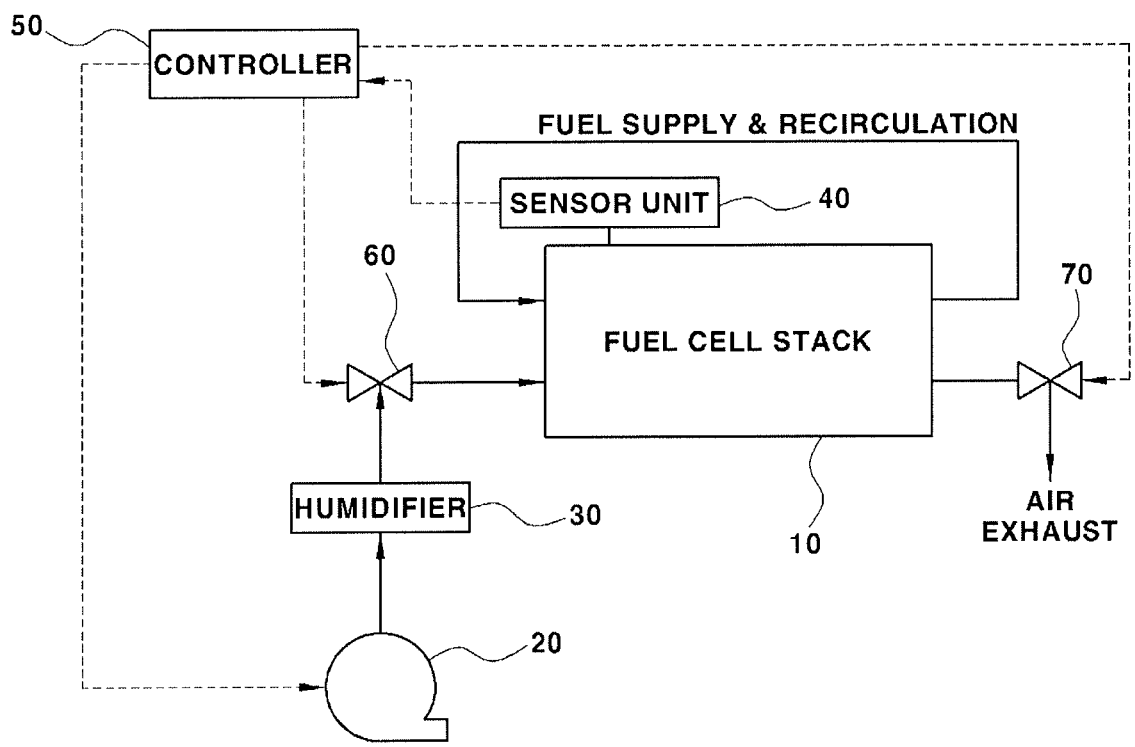
FIG. 1 illustrates a configuration of an apparatus for controlling operation of a fuel cell system in accordance with the exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The terms "first," "second," "third" among the terms described in the present specification are merely added with numerical expressions in order to distinguish terms used in the embodiment, it is not intended to limit the respective meaning.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Below, while the present disclosure has been described with reference to exemplary embodiments thereof, it will be understood by those skilled in the art that various modifications and changes for the elements of the present disclosure can be made without departing from the scope of the present disclosure. Accordingly, the present disclosure should not be construed as limited to the exemplary embodiments described herein, but should be construed as including all possible embodiments within the scope of the appended claims.

FIG. 1 illustrates a configuration of an apparatus for controlling operation of a fuel cell system in accordance with the exemplary embodiment of the present disclosure. As illustrated in FIG. 1, an apparatus for controlling operation of a fuel cell system in accordance with the present disclosure may include a fuel cell stack 10, an air supply line for supplying air to the fuel cell stack 10 and a fuel supply line for supplying hydrogen that is a fuel.

The air supply line may be connected to the cathode of the fuel cell stack 10, and the air supply line may include an air compressor (e.g., a blower) 20 configured to supply air to the stack and air blocking valves 60, 70 installed at stack inlet/outlet for blocking the air flowed into the stack. In addition, a humidifier 30 may be interposed between the air compressor 20 and the stack inlet side first air blocking valve 60. The air supplied to the fuel cell stack 10 side through the first air blocking valve 60 may be exhausted through the second air blocking valve 70 installed at the outlet side of the fuel cell stack 10.

The fuel supply line may be connected to the anode of the fuel cell stack 10 and may include a recirculation line for recirculating fuel to supply it back to the stack. In addition, according to the exemplary embodiment of the present disclosure, a sensor unit 40 configured to measure parameters for the fuel cell stack 10 may be installed in the fuel cell system. Specifically, the fuel cell stack 10 may include the sensor unit 40 configured to measure a stack current, an insulation resistance of the stack, etc. The sensor unit 40 may include a current sensor configured to measure the stack current and an insulation resistance sensor configured to measure the insulation resistance of the stack, the sensors are of a known type, and a detailed description thereof is omitted herein.

The measured parameters, particularly the stack current and the stack insulation resistance values, measured using the sensor unit 40 may be delivered to a controller 50, and the controller 50 may be configured to operate the air compressor 20 and the first air blocking valve 60 based on the delivered measurement values. In other words, the controller 50 may be configured to continuously receive information regarding the stack current and insulation resistance values of the fuel cell stack 10 from the sensor unit 40, and may be configured to adjust the air supply amount delivered to the stack using the received information to thus adjust the amount of residual generated water in the stack.

Figure 2:
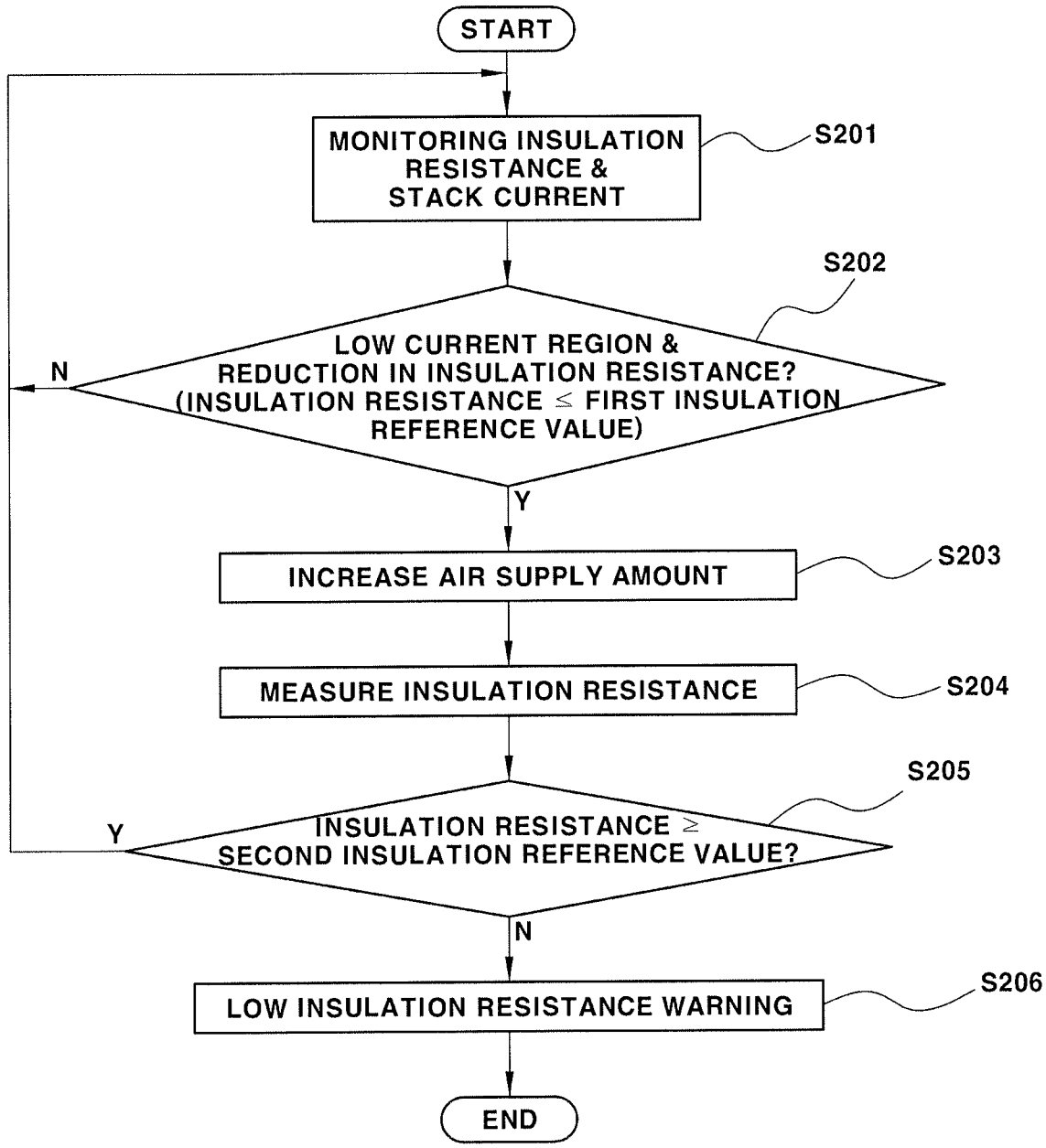
FIG. 2 illustrates a method of controlling the operation of the fuel cell system in accordance with a first exemplary embodiment of the present disclosure.

A specific method of controlling the operation of the fuel cell system performed in the controller 50 is illustrated in FIG. 2. First, FIG. 2 illustrates a method of controlling operation of a fuel cell system in accordance with a first exemplary embodiment of the present disclosure. As illustrated in FIG. 2, according to the first exemplary embodiment of the present disclosure, the stack current and the insulation resistance may be measured by the sensor unit 40 when the fuel cell vehicle starts or the vehicle is operating, and the controller 50 may be configured to monitor the measured stack current and insulation resistance S201.

Then, based on the measurement result, whether the insulation resistance is sufficiently reduced in a low current region may be determined S202. In particular, the measured stack current and insulation resistance values may be compared with predetermined reference values, and to more accurately determine the reduction state of the insulation resistance, whether the above state is maintained for a predetermined reference time $t_1$ or more may be determined.

As a result of monitoring in the S201, in response to confirming that the stack current is detected as the stack current in a region where the stack current is less than a predetermined current reference value, that is, in a low current region, and the insulation resistance is also reduced to a predetermined first insulation reference value or less, the controller may be configured to detect a situation in which a safety problem may occur due to the reduction in the insulation resistance. Accordingly, the air supply amount may be increased S203, and the generated water remaining in the stack may be sufficiently removed as the excess air is supplied into the stack. For example, to increase the air supply amount in the S203, the controller 50 may be configured to increase the RPM of the air compressor 20 while maintaining the opening of the first air blocking valve 60.

The air compressor control for increasing the air supply amount may proceed during a predetermined reference time $t_2$, and after the reference time $t_2$ elapses, the insulation resistance in the stack may be measured again S204. In particular, the controller 50 may maintain the RPM of the air compressor 20 at an increased level, or restore the RPM to a previous level. As a result of measuring in the S204, the controller may be configured to compare the insulation resistance with a predetermined second insulation reference value. Herein, the second insulation reference value (the second insulation reference value>the first insulation reference value) is a reference value for determining whether the reduced insulation resistance has sufficiently recovered, and may be set to a value greater than the first insulation reference value. For example, when the normal insulation resistance is about 400 kΩ and the first insulation reference value for determining the reduction in the insulation resistance is set to 250 kΩ, the second insulation reference value may be set to 350 kΩ, which is a value therebetween.

In the S205, when the insulation resistance is less than the second insulation reference value, the reduction in the insulation resistance is not resolved despite the increase in the air supply amount, and a low insulation resistance warning may be delivered to the driver S206. The warning may be provided in the form of a ringing alarm or a warning light on the vehicle instrument panel. In the S205, when the insulation resistance is greater than or equal to the second insulation reference value, the controller may be configured to determine that the insulation resistance is recovered to a safe level to return to the monitoring the stack current and insulation resistance of the S201.

Figure 3:
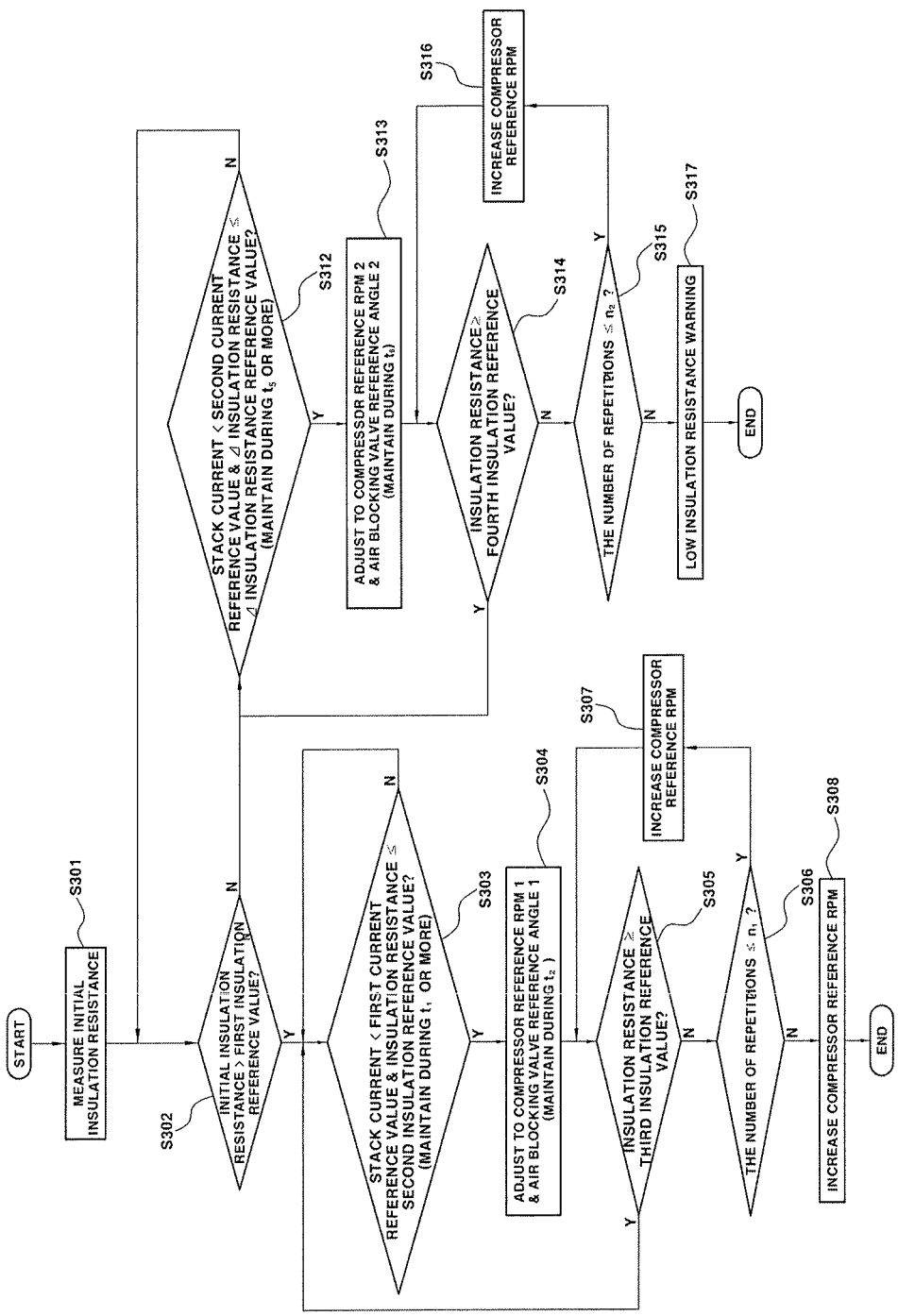
FIG. 3 illustrates a method of controlling the operation of the fuel cell system in accordance with a second exemplary embodiment of the present disclosure.

FIG. 3 illustrates a method of controlling operation of a fuel cell system in accordance with a second exemplary embodiment of the present disclosure. The second exemplary embodiment of FIG. 3 sets a reference value relating to the insulation resistance of the fuel cell system and controls by dividing into two control states (States 1 & 2) depending upon the comparison result between an initial insulation resistance measurement value and the reference value of the fuel cell stack 10.

In FIG. 3, the left flow S302 to S308 are for the State 1 with sufficiently large insulation resistance measurement value, and the right flow S312 to S317 are for the State 2 with relatively small insulation resistance measurement value. Specifically, after starting the fuel cell vehicle, a system insulation representative value may be obtained for a certain time after the start of the power generation of the fuel cell stack, and this is referred to as an initial insulation resistance. For example, after the fuel cell has been started, the insulation resistance of the stack may be measured for about 30 seconds to 60 seconds, and the average value thereof may be used as the initial insulation resistance. Accordingly, the initial insulation resistance may be measured by the sensor unit 40 in the S301, and the measured initial insulation resistance may be compared with the predetermined first insulation reference value S302.

In particular, the first insulation reference value in the second exemplary embodiment is a value provided for selectively performing a control depending upon the State 1 or the State 2 according to the magnitude of the initial insulation resistance. Accordingly, when the initial insulation resistance is greater than the first insulation reference value (e.g., about 400 kΩ), the initial insulation resistance may be determined to be normal to perform the State 1. When the initial insulation resistance is less than or equal to the first insulation reference value (e.g., about 400 kΩ), the initial insulation resistance may be determined to be low, and the insulation resistance may be changed to a relative value to proceed the State 2 S312-S317. In other words, as in the right flow (the State 2) of FIG. 2, whether the insulation resistance is reduced using the variation in the insulation resistance and the reference value thereof may be determined S312.

Referring again to the flow of the State 1 on the right side of FIG. 3, when the initial insulation resistance is greater than the first insulation reference value, the stack current and insulation resistance may be compared with the predetermined reference value S303. In other words, in the S303, the stack current may be compared with the predetermined first current reference value, and the insulation resistance of the stack may be compared with the predetermined second insulation reference value to confirm whether the insulation resistance is sufficiently reduced in the low current region S303. To more accurately determine the reduction state of the insulation resistance, whether the above state is maintained for the predetermined reference time ($t_1$) or more may be considered.

When the stack current is detected as the stack current in a region where the stack current is less than the predetermined first current reference value (e.g., about 20 A), that is, in the low current region, and the insulation resistance is to confirmed to be reduced to the predetermined second insulation reference value (e.g., about 250 kΩ) or less, the controller may be configured to detect a safety problem caused by the reduction in the insulation resistance. In other words, when the above condition is satisfied, the controller may be configured to determine that the generated water in the stack is accumulated inside the stack in the low current region (e.g., about 20 A or less) in which there is almost no air flow, and a conductive path in the stack may be formed to reduce the insulation of the fuel cell system, and the following step is performed. When the above condition is not satisfied, that is, when the system insulation is maintained, the system insulation value may be continuously monitored.

In response to determining that the insulation resistance is reduced, the air supply amount may be increased through the step like the S304, thus sufficiently removing the generated water remaining in the stack as the excess air is supplied into the stack (e.g., removing water inside the stack due to the increase in air supply). For example, the controller 50 may be configured to increase the RPM of the air compressor 20 to a compressor reference RPM 1 while maintaining the opening of the first air blocking valve 60 at a reference angle 1 S304. In particular, the compressor reference RPM 1 (e.g., the compression reference RPM1=30,000 rpm) and the air blocking valve reference angle 1 (e.g., the air blocking valve reference angle 1=50°) may be determined in advance as the reference value determined by the test, and the controller 50 may be configured to maintain the compressor reference RPM1 and the air blocking valve reference angle 1 during the reference time 2 (e.g., the reference time 2 ($t_2$)=4 seconds).

Meanwhile, when more air is supplied than the conditions given herein (the compressor reference speed 1, the air blocking valve reference angle 1, and the reference time 2) (e.g., the increase in flow amount and time), the generated water inside the stack may be completely removed to recover the system insulation. However, a stack voltage (e.g., about 360V) may increase above a certain reference value to increase more than a battery voltage installed in the vehicle, and a battery may be charged with electricity to cause overcharging of the battery. Accordingly, fuel efficiency of the fuel cell vehicle may be reduced. Thus, the compressor reference RPM 1, the air blocking valve reference angle 1, and the reference time 2 may be set to prevent the stack voltage from increasing greater than than the battery voltage to prevent the battery overcharging.

The air compressor control for increasing the air supply amount may be performed for the predetermined reference time ($t_2$), and the water accumulated inside the stack should be discharged to the outside by the air additionally supplied during the reference time 2 to gradually increase the insulation resistance of the fuel cell system. Thereafter, the insulation resistance in the stack may be measured again and as the measurement result, the insulation resistance and a predetermined third insulation reference value may be compared S305. The third insulation reference value (the third insulation reference value>the second insulation reference value) is a reference value for determining whether the reduced insulation resistance has sufficiently recovered, and may be set to a value greater than the second insulation reference value. In addition, the third insulation reference value may be set to a value less than the first insulation reference value provided for distinguishing the State 1 and the State 2.

For example, when the first insulation reference value is about 400 kΩ and the second insulation reference value for determining the reduction in the insulation resistance is set at 250 kΩ, the third insulation reference value may be set to 350 kΩ, which is a value therebetween. Accordingly, after the reference time 3 (e.g., the reference time 3 ($t_3$)=90 seconds) elapses, when the insulation resistance of the fuel cell system is measured and the measured insulation resistance value is recovered to the third insulation reference value (e.g., 350 kΩ) or more, the method may return to the monitoring the stack current and the insulation resistance and comparing the stack current and insulation resistance with the reference values of the S303.

Moreover, in response to determining that the water inside the stack has not yet been discharged, the following step for additional air supply may be performed. As in the S305 of FIG. 3, when the insulation resistance is less than the third insulation reference value, the reduction in the insulation resistance is not resolved despite the increase in the air supply amount and a low insulation resistance warning may be delivered to the driver S308. The warning may be provided in the form of a ringing alarm or a warning light on the vehicle instrument panel. In particular, the controller 50 may be configured to restore the RPM of the air compressor 20 to the previous level or maintain the RPM of the compressor.

In addition, after the S305, it may be possible to repeat increasing the compressor reference RPM for a predetermined reference time 4 ($t_4$) by a certain number of times or less. Specifically, when set to n1=3, it may be possible to repeat increasing the compressor reference RPM until the number of repetitions becomes three. For example, assuming that the compressor reference RPM 1 in the S304 is 30,000 rpm and the increase in the predetermined compressor RPM is 5,000 rpm, the compressor may be driven at 30,000 rpm for the first, at 35,000 rpm for the second, and at 40,000 rpm for the third. Accordingly, as in FIG. 3, the number of repetitions may be compared with a predetermined limit value S306, and the compressor reference RPM may be further increased only when it is equal to or less than the limit value S307.

Herein, the limit value related to the number of repetitions may be set to solve the problem in that the voltage of the fuel cell stack 10 is greater than the battery voltage described above to cause the battery overcharging. When the number of times of increasing the compressor RPM exceeds the predetermined limit value, the system insulation resistance may be determined low, and the system insulation warning may be generated by the controller 50.

In repeating the increase in the compressor RPM, the air blocking valve reference angle and holding time may be set to be the same. However, a method of setting the compressor reference RPM, and the air blocking valve reference angle and holding time is only one example, and the present disclosure is not limited to this example. Meanwhile, when the initial insulation resistance is less than or equal to the first insulation reference value (e.g., 400 kΩ), the initial insulation resistance may be determined to be low and the control in the State 2 may be performed.

Each control S312 to S317 of the State 2 may be performed in substantially the same manner as the series of the S303 to S308 in the State 1, except that the change amount value in the insulation resistance in the S312 is used. Specifically, in the S312, when the initial insulation resistance is less than or equal to the first insulation reference value (e.g., 400 kΩ), current insulation resistance of the present fuel cell system may be determined to be low, and may be determined by changing a compare object in the insulation state to the relative value relating to the variation with time, rather than the absolute value of the insulation resistance.

In other words, the comparison between the stack current and the predetermined second current reference value is substantially the same as that in the S303, but in the S312, there is a difference in that the variation in the insulation resistance (Δ insulation resistance) may be compared with the reference value (Δ insulation resistance reference value) for the variation in the insulation resistance. In response to confirming that the stack current is in the low current region and the insulation resistance is greatly reduced during a predetermined reference time 5 ($t_5$), a safety problem caused by the reduction in the insulation resistance may be detected and thus, the following step may be performed.

In particular, to determine the low current region, the predetermined second current reference value may be set to be equal to or less than about 20 A, which is the same as the first reference current value. In addition, the reference value (Δ Insulation resistance reference value) for the variation in the insulation resistance (the initial insulation resistance-current insulation resistance) may be set to about 100 kΩ, and when the change in the insulation resistance is greater than about 100 kΩ, the insulation resistance may be determined to be substantially reduced. In this regard, the use of the variation in the insulation resistance in the State 2 is to use the relative measurement value related to the initial insulation resistance since it is impossible to recover rather than the initial insulation no matter how much air is supplied when the initial insulation resistance is low.

When the condition in the S312 is not satisfied, the system insulation may be determined to be maintained, and thus, the system insulation value may be continuously monitored. In response to determining that the insulation resistance is reduced, the air supply amount may be increased in S313 (e.g., removing the water inside the stack due to the increase in air supply). For example, the controller 50 may be configured to increase the RPM of the air compressor 20 to a compressor reference RPM 2 while maintaining the opening of the first air blocking valve 60 at a reference angle 2 S313. In particular, the compressor reference RPM 2 and the air blocking valve reference angle 2 may be set to be the same values as the compressor reference RPM 1 and the air blocking valve reference angle 1, respectively, and a reference time 6 ($t_6$) may also be set to be the same as the reference time 2 ($t_2$).

The compressor reference RPM 2, the air blocking valve reference angle 2, and the reference time 6 may be set to prevent the stack voltage from increasing more than the battery voltage to prevent the battery overcharging as the above example in the State 1. The air compressor control for increasing the air supply amount may be performed for the predetermined reference time ($t_6$) and the water accumulated inside the stack should be discharged to the outside by the air additionally supplied during the reference time 6.

Thereafter, the insulation resistance of the fuel cell system gradually increases as the air supply amount increases, and after a predetermined reference time 7 ($t_7$) elapses, the insulation resistance in the stack may be measured again and as the measurement result, the insulation resistance may be compared with a predetermined fourth insulation reference value S314. The fourth insulation reference value is a value corresponding to the third insulation reference value, for example, about 90% of the initial insulation resistance value.

After the reference time 7 ($t_7$) elapses, when the insulation resistance of the fuel cell system is measured and the measured insulation resistance value has been recovered to the fourth insulation reference value or more, the method may return to the monitoring the stack current and the variation in the insulation resistance and the comparing the above values with the reference values thereof in the S312. In response to determining that the water inside the stack has not yet been discharged, the following step for additional air supply may be performed.

After S314, increasing the compressor reference RPM for a predetermined reference time 8 ($t_8$) may be repeated at a certain number of times or less S315, S316. Accordingly, as shown in FIG. 3, the number of repetitions may be compared with a predetermined limit value S315, and the compressor reference RPM may be further increased only when it is equal to or less than the limit value S316. When the number of times of increasing the compressor RPM exceeds a predetermined limit value, the system insulation resistance may be determined to be low, and thereby, the system insulation warning may be generated by the controller 50 S317.

Figure 4:
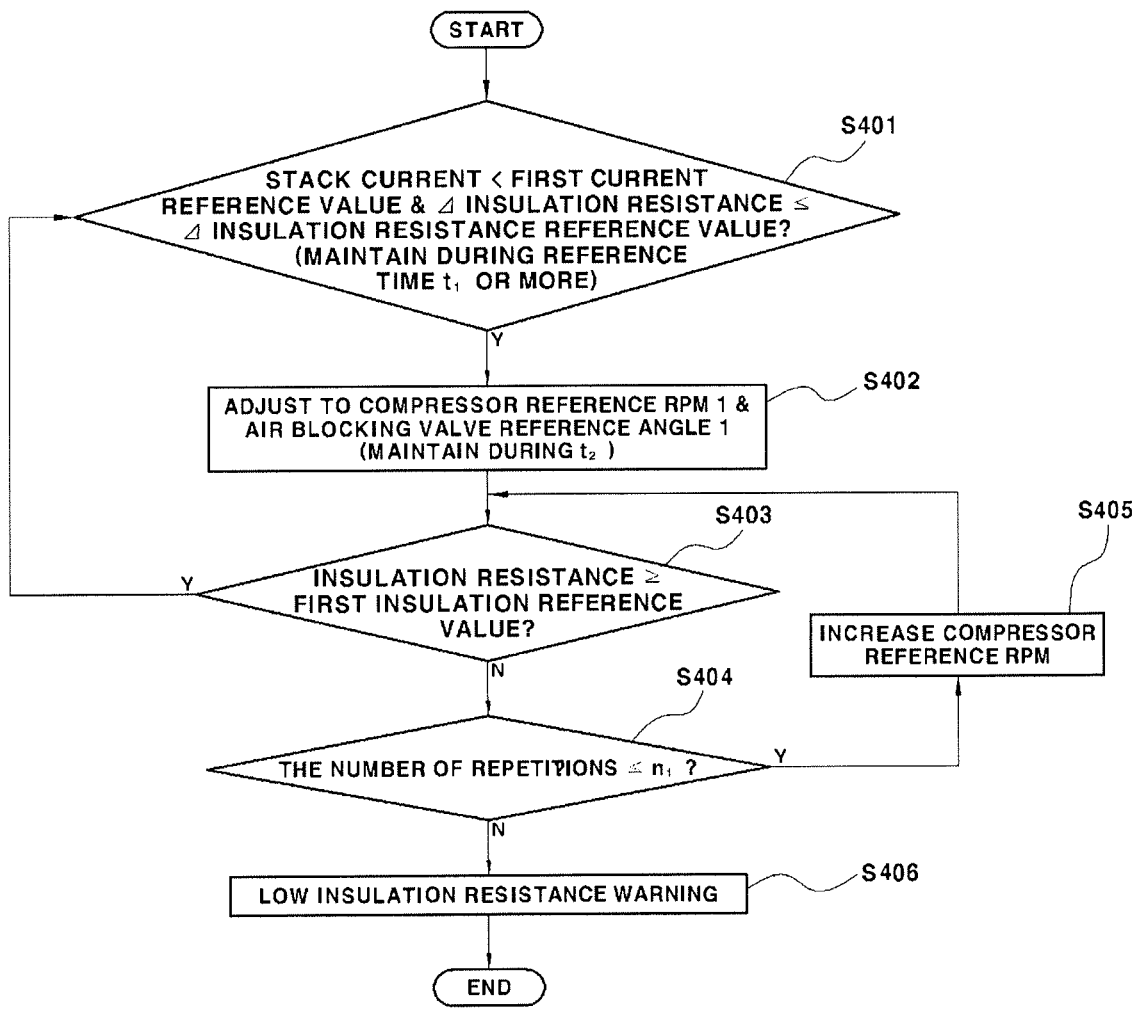
FIG. 4 illustrates a method of controlling the operation of the fuel cell system in accordance with a third exemplary embodiment of the present disclosure; and It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

FIG. 4 illustrates a method of controlling operation of a fuel cell system in accordance with a third exemplary embodiment of the present disclosure, and FIG. 4 is substantially the same as in the State 2 of FIG. 3. In other words, regardless of the comparison result between the initial insulation resistance and the reference value thereof, the third exemplary embodiment of the present disclosure in FIG. 4 selectively controls the increase in the air supply amount only when the difference between the variations in the measured insulation resistance in the low current region occurs.

Accordingly, the S401 to S406 are substantially the same as the S312 to S317 of the second embodiment. In other words, in the S401, the stack current may be compared with the predetermined first current reference value, and the variation of the insulation resistance (Δ Insulation resistance) may be compared with a reference value (Δ Insulation resistance reference value) for the variation in the insulation resistance.

When the stack current is in the low current region and the variation of the insulation resistance (Δ Insulation resistance) is less than or equal to the reference value (Δ Insulation resistance reference value) for the variation in the insulation resistance during the predetermined reference time 1 ($t_1$), a safety problem caused by the reduction in the insulation resistance may be detected and thus, the following step may be performed. In particular, to determine the low current region, the predetermined second current reference value may be set to about 20 A or less as in the above exemplary embodiments. In addition, the reference value (Δ Insulation resistance reference value) for the variation in the insulation resistance (the initial insulation resistance-current insulation resistance) may be set to about 100 kΩ, and when the change in the insulation resistance is greater than about 100 kΩ, the insulation resistance may be determined to be substantially reduced.

When the condition of the S401 is not satisfied, the system insulation may be determined to be maintained, and thus, the system insulation value may be continuously monitored. In response to determining that the insulation resistance is reduced, the air supply amount may be increased S402 (e.g., removing the water inside the stack due to the increase in air supply). For example, the controller 50 may be configured to increase the RPM of the air compressor 20 to the compressor reference RPM 1 while maintaining the opening of the first air blocking valve 60 at the reference angle 1 S402. In particular, the compressor reference RPM 1 and the air blocking valve reference angle 1 may be maintained during the reference time 2 ($t_2$).

The compressor reference RPM 1, the air blocking valve reference angle 1, and the reference time 2 ($t_2$) may be set to prevent the stack voltage from increasing more than the battery voltage to prevent the battery overcharging as in the above exemplary embodiments. The air compressor control for increasing the air supply amount may be performed during the predetermined reference time 2 ($t_2$), and the water accumulated inside the stack should be discharged to the outside by the air additionally supplied during the reference time 2.

Thereafter, the insulation resistance of the fuel cell system gradually increases as the air supply amount increase, and after the predetermined reference time 3 ($t_3$) elapses, the insulation resistance in the stack may be measured again and as a measurement result, the insulation resistance may be compared with the predetermined first insulation reference value S403. Herein, the first insulation reference value may be set to about 90% of the initial insulation resistance value.

After the reference time 3 ($t_3$) elapses, when the insulation resistance of the fuel cell system is measured and the measured insulation resistance value is recovered to the first insulation reference value or more, the method may return to the monitoring the stack current and the variation in the insulation resistance and the comparing the above values with the reference values thereof of the S401. On the other hand, in response to determining that the water inside the stack has not yet been discharged, the following step for additional air supply may be performed.

Particularly, after the S403, it may be possible to repeat increasing the compressor reference RPM during the predetermined reference time 8 ($t_8$) by a certain number of times or less. Accordingly, a sin FIG. 3, the number of repetitions may be compared with a predetermined limit value S404, and the compressor reference RPM may be further increased only when it is equal to or less than the limit value S405. When the number of times increasing the compressor RPM exceeds the predetermined limit value, the system insulation resistance may be determined to be low, and thus, the system insulation warning may be generated by the controller 50 S406.

Having described the exemplary embodiments of the present disclosure in detail with reference to the drawings, the present disclosure is not limited to the above-described exemplary embodiments, and various modifications can be made without departing from the technical scope of the present disclosure.

What is claimed is:

1. A method of controlling operation of a fuel cell system, comprising:
measuring, by a sensor unit, a stack current and a stack insulation resistance;
comparing, by a controller, the measured stack current with a predetermined current reference value, and comparing the measured stack insulation resistance with a predetermined first insulation reference value; and
increasing, by the controller, an air supply amount to a fuel cell stack during a predetermined time when the measured stack current is less than the predetermined current reference value and the measured stack insulation resistance is less than or equal to the predetermined first insulation reference value.

2. The method of controlling the operation of the fuel cell system of claim 1, further comprising:
measuring, by the sensor unit, a stack insulation resistance after the air supply amount is increased;
comparing the stack insulation resistance measured after the air supply amount is increased with a second insulation reference value;
outputting a low insulation resistance warning when the stack insulation resistance measured after the air supply amount is increased is less than the second insulation reference value.

3. The method of controlling the operation of the fuel cell system of claim 2, repeating the measuring of the stack current and the stack insulation resistance and monitoring the measurement result when the stack insulation resistance measured after the air supply amount is increased is greater than or equal to the second insulation reference value.

4. The method of controlling the operation of the fuel cell system of claim 1, wherein the increasing the air supply amount includes:
increasing, by the controller, a revolutions per minute (RPM) of an air compressor while maintaining an opening angle opening of an air blocking valve.

5. The method of controlling the operation of the fuel cell system of claim 4, wherein the opening angle of the air blocking valve to be maintained and the increased RPM of the air compressor are preset and stored in the controller to prevent a stack voltage from exceeding a battery voltage.

6. A method of controlling operation of a fuel cell system, comprising:
measuring, by a sensor unit, an initial insulation resistance;

comparing, by a controller, the initial insulation resistance with a predetermined first insulation reference value;

measuring, by the sensor unit, a stack current and a stack insulation resistance when the initial insulation resistance is greater than the first insulation reference value;

comparing, by the controller, the measured stack current with the predetermined first current reference value, and comparing the measured stack insulation resistance with a predetermined second insulation reference value; and increasing, by the controller, an air supply amount to a fuel cell stack during a predetermined time when the measured stack current is less than the predetermined first current reference value and the measured stack insulation resistance is less than or equal to the predetermined second insulation reference value.

7. The method of controlling the operation of the fuel cell system of claim 6, further comprising:

measuring, by the sensor unit, the stack current and the variation in the stack insulation resistance when the initial insulation resistance is less than or equal to the first insulation reference value;

comparing, by the controller, the measured stack current with a predetermined second current reference value, and comparing the measured variation in the stack insulation resistance with a reference value for a predetermined reference value for the variation in the insulation resistance; and increasing, by the controller, the air supply amount to the fuel cell stack during the predetermined time when the measured stack current is less than the predetermined second current reference value and the measured variation in the stack insulation resistance is less than or equal to the predetermined reference value for the variation in the insulation resistance.

8. The method of controlling the operation of the fuel cell system of claim 6, further comprising:

measuring, by the sensor unit, the stack insulation resistance after the air supply amount is increased;

comparing, by the controller, the stack insulation resistance measured after the air supply amount is increased with a third insulation reference value; and outputting, by the controller, a low insulation resistance warning when the stack insulation resistance measured after the air supply amount is increased is less than the third insulation reference value.

9. The method of controlling the operation of the fuel cell system of claim 7, further comprising:

measuring, by the sensor unit, the stack insulation resistance after the air supply amount is increased; and comparing, by the controller, the stack insulation resistance measured after the air supply amount is increased with a fourth insulation reference value;

outputting, by the controller, a low insulation resistance warning when the stack insulation resistance measured after the air supply amount is increased is less than the fourth insulation reference value.

10. The method of controlling the operation of the fuel cell system of claim 6, further comprising:

repeating the measuring of the stack current and the stack insulation resistance and monitoring the measurement result when the stack insulation resistance measured after the air supply amount is increased is greater than or equal to the third insulation reference value.

11. The method of controlling the operation of the fuel cell system of claim 7, further comprising:

repeating the measuring of the stack current and the variation in the stack insulation resistance and monitoring the measurement result when the stack insulation resistance measured after the air supply amount is increased is greater than or equal to the fourth insulation reference value.

12. The method of controlling the operation of the fuel cell system of claim 6, further comprising:

increasing, by the controller, the air supply amount to the fuel cell stack by adjusting a revolutions per minute (RPM) of an air compressor to be increased while maintaining an opening angle of an air blocking valve.

13. The method of controlling the operation of the fuel cell system of claim 12, wherein the opening angle of the air blocking valve to be maintained and the increased RPM of the air compressor are preset and stored in the controller to prevent a stack voltage from exceeding a battery voltage.

14. The method of controlling the operation of the fuel cell system of claim 12, further comprising:

repeating, by the controller, the increasing of the reference RPM at a predetermined limit value or less when the stack insulation resistance measured after the air supply amount is increased is less than the third insulation reference value or the fourth insulation reference value.

15. An apparatus for controlling operation of a fuel cell system, comprising:

a fuel cell stack;

an air compressor configured to supply air to the fuel cell stack;

an air blocking valve interposed between the air compressor and the fuel cell stack, and installed at a cathode inlet side of the fuel cell stack;

a sensor unit configured to measure a stack current and a stack insulation resistance of the fuel cell stack; and a controller configured to receive the information measured from the sensor unit and operate the air compressor and the air blocking valve, wherein the controller is configured to compare the measured stack current by the sensor unit with a predetermined first current reference value, and compare the measured stack insulation resistance by the sensor unit with a predetermined first insulation reference value, and wherein the controller is configured to increase a revolutions per minute (RPM) of the air compressor to increase the air supply amount supplied to the fuel cell stack when the measured stack current is less than the predetermined first current reference value, and the measured stack insulation resistance is less than or equal to the predetermined first insulation reference value.

16. The apparatus for controlling the operation of the fuel cell system of claim 15, wherein the sensor unit is configured to measure the stack insulation resistance after the air supply amount is increased, and the controller is configured to compare the stack insulation resistance measured after the air supply amount is increased with the predetermined second insulation reference value, and output a low insulation resistance warning when the stack insulation resistance measured after the air supply amount is increased is less than the second insulation reference value.

17. The apparatus for controlling the operation of the fuel cell system of claim 15, wherein the controller is configured to increase the RPM of the air compressor while maintaining an opening angle of the air blocking valve.

18. The apparatus for controlling the operation of the fuel cell system of claim 17, wherein the opening angle of the air blocking valve to be maintained and the increased RPM of the air compressor are preset and stored in the controller to prevent a stack voltage from exceeding a battery voltage.

19. The apparatus for controlling the operation of the fuel cell system of claim 15,
   wherein the sensor unit is configured to measure an initial insulation resistance when the fuel cell is initially started;
   wherein the controller is configured to compare the measured stack current with a predetermined second current reference value and compare the measured variation in the stack insulation resistance with a predetermined reference value for the variation in the insulation resistance when the initial insulation resistance is less than or equal to the reference value, and
   wherein the controller is configured to adjust the RPM of the air compressor to increase the air supply amount to the fuel cell stack during the predetermined time, when the measured stack current is less than the predetermined second current reference value and the measured variation in the stack insulation resistance is less than or equal to the predetermined reference value for the variation in the insulation resistance.

20. The apparatus for controlling the operation of the fuel cell system of claim 15, wherein the controller is configured to repeat the increasing of the reference RPM at a predetermined limit value or less when the stack insulation resistance measured after the air supply amount is increased by the sensor unit is less than the first insulation reference value.

* * * * *